(12) United States Patent
Caudill

(10) Patent No.: US 8,035,250 B2
(45) Date of Patent: Oct. 11, 2011

(54) SYSTEM AND METHOD FOR LOAD SHARING IN MULTI-MODULE POWER SUPPLY SYSTEMS

(75) Inventor: Richard T. Caudill, Westerville, OH (US)

(73) Assignee: Liebert Corporation, Columbus, OH (US)

(*) Notice: Subject to any disclaimer, the term of this patent is extended or adjusted under 35 U.S.C. 154(b) by 352 days.

(21) Appl. No.: 12/357,839

(22) Filed: Jan. 22, 2009

(65) Prior Publication Data

US 2009/0230772 A1 Sep. 17, 2009

Related U.S. Application Data

(60) Provisional application No. 61/036,577, filed on Mar. 14, 2008.

(51) Int. Cl.
 *H02J 9/00* (2006.01)
 *H02J 1/00* (2006.01)
 *G05D 3/12* (2006.01)
(52) U.S. Cl. .............................. 307/65; 307/82; 700/286
(58) Field of Classification Search .................... 307/65, 307/82; 700/286
 See application file for complete search history.

(56) References Cited

U.S. PATENT DOCUMENTS

| | | | |
|---|---|---|---|
| 5,237,208 | A | 8/1993 | Tominaga et al. |
| 5,905,645 | A | 5/1999 | Cross |
| 6,459,171 | B1 | 10/2002 | Leifer |
| 6,664,657 | B2 | 12/2003 | Hailey |
| 6,721,672 | B2 | 4/2004 | Spitaels et al. |
| 6,917,124 | B2 | 7/2005 | Shetler, Jr. et al. |
| 7,099,784 | B2 | 8/2006 | Spitaels et al. |
| 7,274,112 | B2 | 9/2007 | Hjort et al. |
| 7,330,016 | B2 | 2/2008 | Colley |
| 7,668,624 | B2 * | 2/2010 | Heber et al. ................. 700/286 |
| 2006/0290205 | A1 | 12/2006 | Heber et al. |
| 2007/0094524 | A1 | 4/2007 | Kris |

FOREIGN PATENT DOCUMENTS

| | | |
|---|---|---|
| JP | 2005295713 | 10/2005 |
| JP | 2005318673 | 11/2005 |

OTHER PUBLICATIONS

Laszlo, Balogh. 2003 Power Seminar. "Paralleling Power—Choosing and Applying the Best Technique for Load Sharing", Texas Instruments, Incorporated, http://focus.ti.com/lit/ml/slup207/slup207.pdf, Jul. 14, 2003, 31 pages.

(Continued)

*Primary Examiner* — Michael Rutland Wallis

(74) *Attorney, Agent, or Firm* — Harness, Dickey & Pierce, P.L.C.

(57) ABSTRACT

A load sharing, multi-module power supply system for supplying power to a load. The system may involve: a first power supply module having a controller, and having a first per unit capacity (pu-c); a second power supply module having a controller, and having a second per unit capacity (pu-c); the controller of the first power supply module adapted to implement a reduction in an output power of the first power supply module upon the detection of an operating event, where a portion of the load being handled by the first power supply module is shed by a percentage, and such that the first power supply module remains operating during the operating event but at a reduced power output level; and upon the occurrence of the operating event the controller of the second power supply module is adapted to increase a power output of the second power supply module sufficient to accommodate the portion of the load that has been shed by the first power supply module.

10 Claims, 6 Drawing Sheets

OTHER PUBLICATIONS

Barnette, J. L.; Zolghadin, M. R.; Walters, M.; Homaifar, A. 2006 1ST IEEE Conference on Industrial Electronics and Applications, "Temperature Integrated Load Sharing of Paralleled Modules", May 25, 2006, pp. 1-136.

* cited by examiner

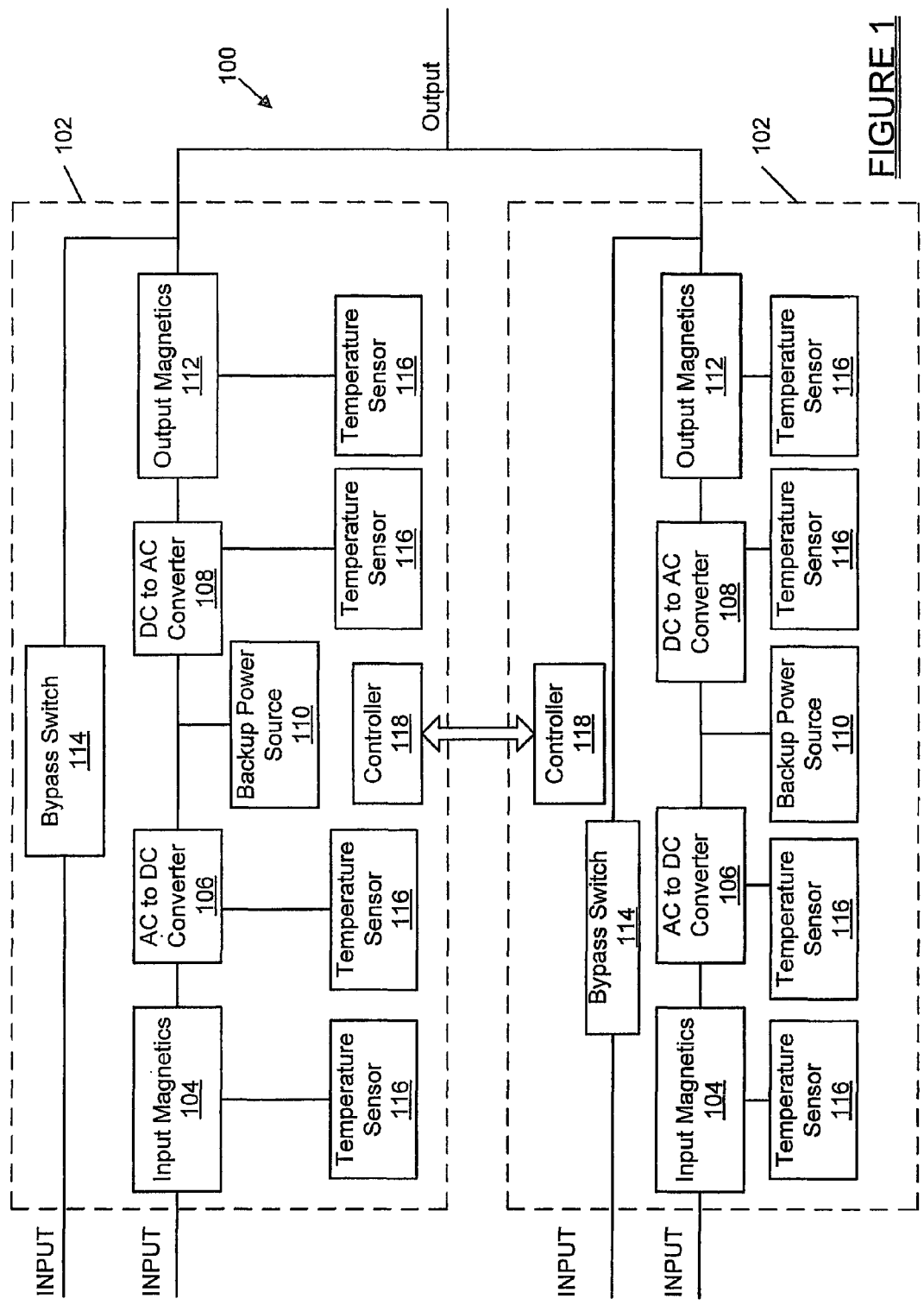

SYSTEM AND METHOD FOR LOAD SHARING IN MULTI-MODULE POWER SUPPLY SYSTEMS

CROSS-REFERENCE TO RELATED APPLICATIONS

This application claims the benefit of U.S. Provisional Application No. 61/036,577 filed on Mar. 14, 2008. The disclosure of the above application is hereby incorporated by reference into the present disclosure.

FIELD

The present disclosure relates to power supply modules, and more particularly to load sharing in multi-module power supply systems.

BACKGROUND

The statements in this section merely provide background information related to the present disclosure and may not constitute prior art.

Multi-module power supplies, for example uninterruptible power supply ("UPS") systems, have multiple UPS's, typically referred to as a UPS module, and typically load share among the UPS modules. Load sharing is used to equalize the stress on each UPS module and to provide the maximum range of load increase while causing the minimum load change for any individual UPS module. Each UPS module of the multi-module UPS system is limited to operating within its thermal capability to prevent damage to its internal components. When the internal temperature of a module reaches a maximum, the UPS module is disconnected (e.g., shut down) from the load until the problem is resolved, such as a repair made. This will result in either loss of redundant UPS module and/or an increase in the load for the UPS modules remaining connected to the load.

FIG. 1 shows a basic block diagram of a prior art multi-module UPS system 100. While multi-module UPS system 100 is shown as having two UPS modules 102, it should be understood that multi-module UPS system 100 can have more than two UPS modules 102.

Each UPS module 102 includes input magnetics subsystem 104 (such as an input transformer), an output of which is coupled to an input of an AC/DC converter 106. The AC/DC converter 106 may typically be a rectifier having switched rectifying devices, such as SCR's, thyristors, MOSFETs or the like. An output of AC/DC converter 106 is coupled to an input of DC/AC converter 108 as is an output of a back-up power source 110. Back-up power source 110 can be a battery bank, flywheel, fuel cell, generator or the like that provides power in the event of interruption of input power to multi-module UPS system 100, such as from a electric power utility distribution system. DC/AC converter 108 may illustratively be an inverter. An output of the DC/AC converter 108 is coupled to an input of output magnetics subsystem 112, which may be an output transformer. An output of output magnetics subsystem 112 is coupled to an output of the multi-module UPS system 100, which provides power to a load. A bypass switch 114 may be coupled between the input of UPS module 102, such as the input of input magnetics subsystem 104, to the output of UPS module 102, such as the output of output magnetics subsystem 112. Temperature sensors 116 may be coupled to one or more of input magnetics subsystem 104, AC/DC converter 106, DC/AC converter 108 and output magnetics subsystem 112. Temperature sensors 116 may also be coupled to a controller 118 which controls UPS module 102. Controller 118 may be a programmable device such as a microcontroller, computer or the like. Preferably, temperature sensors 116 are coupled to the components 104, 106, 108 and 112 of every UPS module 102, as indicated in FIG. 1.

FIGS. 2A and 2B are basic schematic illustrations of load sharing in prior art multi-module UPS systems, such as multi-module UPS system 100. In FIG. 2A, each UPS module 102 of multi-module UPS system 100 has the same capacity, or per-unit rating ("pu-c"). The load on multi-module UPS system 100, referred to as the "system load," in FIG. 2A is shared equally among the UPS modules 102. That is, each UPS module 102 supplies the same percentage of the system load. In FIG. 2B, two of the UPS modules 102 have a 1 pu-c and two have a 2 pu-c. The system load is shared proportionally among the UPS modules 102 based on their individual pu-c. That is, each UPS module 102 supplies proportionally a percentage of the system load based on its pu-c.

In multi-module UPS systems such as multi-module UPS system 100, the temperature of critical components, inlet air and exhaust air of each UPS module 102 are monitored to determine if that UPS module 102 is operating within an acceptable range of temperatures. If cooling is insufficient resulting in excessive temperature, an abnormal condition is alarmed and eventually the UPS module 102 is shut down. This can unnecessarily stress the remaining, operating UPS modules, provided the UPS module experiencing an excessive temperature can still be operated satisfactorily at some reduced power output level.

SUMMARY

In one aspect the present disclosure relates to a load sharing, multi-module uninterruptible power supply system for supplying power to a load. The system may comprise: a first power supply module having a controller, and having a first per unit capacity (pu-c); a second power supply module having a controller, and having a second per unit capacity (pu-c); the controller of the first power supply module adapted to implement a reduction in an output power of the first power supply module upon the detection of an operating event, where a portion of the load being handled by the first power supply module is shed by a percentage, and such that the first power supply module remains operating during the operating event but at a reduced power output level; and upon the occurrence of the operating event the controller of the second power supply module is adapted to increase a power output of the second power supply module sufficient to accommodate the portion of the load that has been shed by the first power supply module.

In another aspect the present disclosure relates to a load sharing, multi-module power supply system for supplying power to a load. The system may comprise: a first power supply module having a controller and having a first per unit capacity (pu-c); a second power supply module having a controller and having a second per unit capacity (pu-c); a third power supply module having a controller and having a third per unit capacity (pu-c); said controller of the first power supply module adapted to implement a reduction in an output power of the first power supply module upon the detection of an operating event, where a portion of the load being handled by the first power supply module is shed by a determined percentage, and such that the first power supply module remains operating during the operating event but at a reduced power output level; and upon the occurrence of the operating event, the controllers of the second and third power supply modules being adapted to increase their respective power outputs so that each of the second and third power supply modules accommodates a subportion of the portion of the load that has been shed by the first power supply module.

In another aspect the present disclosure relates to a method for load sharing using a multi-module power supply system. The method may comprise: using a first power supply module having a first per unit capacity (pu-c), to handle a portion of the load; using a second power supply module having a second per unit capacity (pu-c), to handle a second portion of said load; when an operating event is detected by the first power supply module, reducing a power output of the first power supply module so that a percentage of the portion of the load being handled by the first power supply module is shed, but further such that the first power supply module remains operating during the operating event but at a reduced power output level; and upon the occurrence of the operating event, increasing a power output of the second power supply module sufficiently to accommodate the percentage of the portion of the load that has been shed by the first power supply module.

In still another aspect the present disclosure relates to a method for load sharing using a multi-module power supply system. The method may comprise: using a first power supply module having a controller, and having a first per unit capacity (pu-c), to handle a portion of the load; using a second power supply module having a controller, and having a second per unit capacity (pu-c), to handle a second portion of the load; using a third power supply module having a controller, and having a third per unit capacity (pu-c), to handle a third portion of the load; when an operating event is detected by the first power supply module, reducing a power output of the first power supply module so that a percentage of the portion of the load being handled by the first power supply module is shed, but further such that the first power supply module remains operating during the operating event but at a reduced power output level; and upon the occurrence of the operating event, using the controllers of the second and third power supply modules to increase their respective power outputs so that each of the second and third power supply modules accommodates a subportion of said portion of the load that has been shed by the first power supply module.

BRIEF DESCRIPTION OF THE DRAWINGS

The drawings described herein are for illustration purposes only and are not intended to limit the scope of the present disclosure in any way.

FIG. 1 is a block diagram of a prior art multi-module UPS system;

DETAILED DESCRIPTION

Figure 2A:
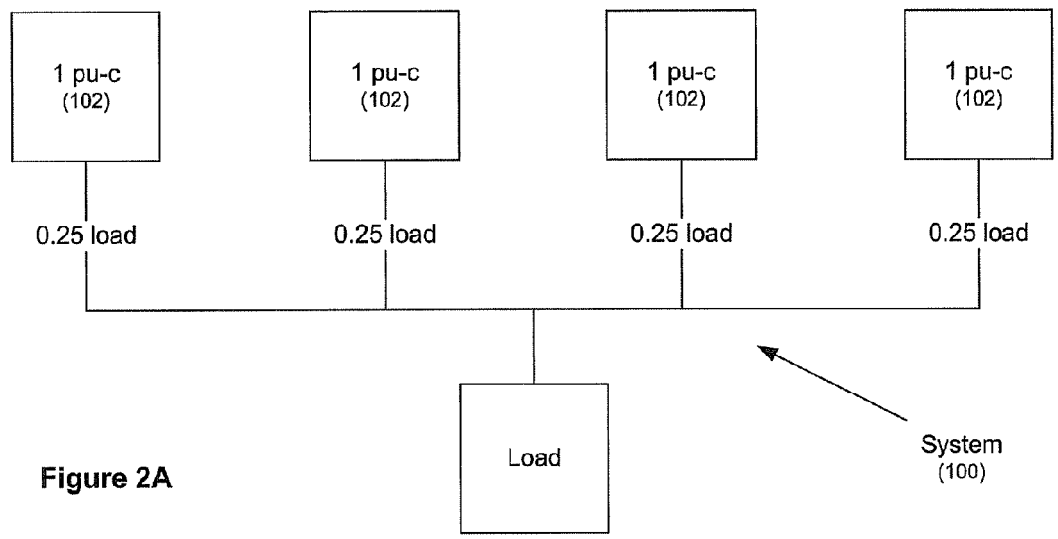
FIGS. 2A and 2B are block diagrams of prior art load sharing, multi-module UPS system.
Figure 2B:
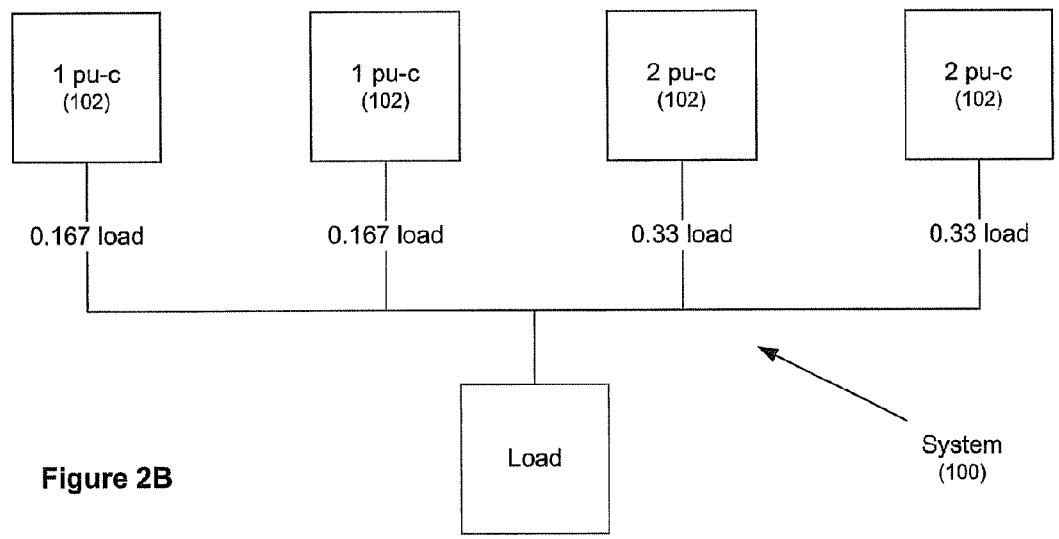
Figure 3:
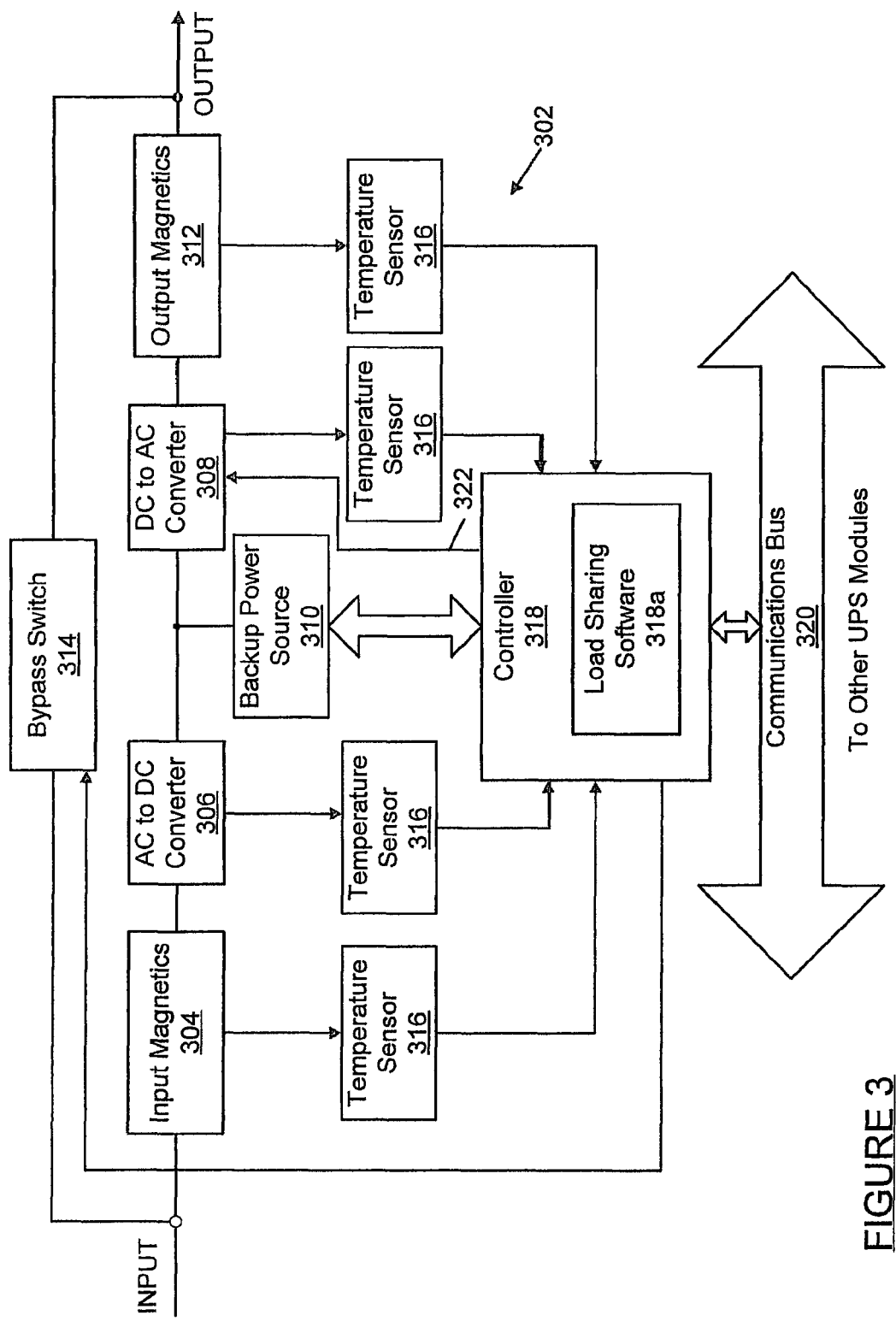
FIG. 3 is a block diagram of a UPS module in accordance with one embodiment of the present disclosure that is well suited for use in a load sharing multi-module UPS system.

Referring to FIG. 3 there is shown a block diagram of one embodiment of a power module suitable for use in a multi-module power supply load sharing UPS system. In this example the power supply module is shown as an uninterruptible power supply (UPS) module, and identified by reference number 302. However, it will be appreciated that the teachings of the present disclosure are not limited to any specific type of power supply. For example, instead of a UPS module, the present disclosure could make use of one or more generators, DC power supplies, motor generators, or virtually any other device capable of producing a quantity of electrical power. For convenience, however, the following discussion will refer to the power supply shown in FIG. 3 as "UPS module" 302, and will also refer to the power supplies discussed in connection with FIGS. 4-6 as UPS modules.

The UPS module 302 may be similar to the multi-mode modules 102 shown in FIG. 1, or it may differ in construction from that shown in FIG. 1. In this example, however, the UPS module 302 will be understood to be similar to the UPS module shown in FIG. 1 and common components of the UPS module 302 will be designated with reference numerals increased by 200 over those used in connection with FIG. 1. Thus, the UPS module 302 may include an input magnetics subsystem 304, an AC to DC converter 306, a backup power source 310, a DC to AC converter (i.e., inverter) 308 and an output magnetics subsystem 312. A bypass switch 314 may be incorporated between an input side of the input magnetics subsystem 304 and an output side of the output magnetics subsystem 312, and controlled via a signal from a controller 318. The controller 318 may be programmed with a maximum pu-c and may make use of load sharing software 318a to determine a needed reduction in the output of the UPS module 302 if the operating temperature of any component of the UPS module 302 is determined to be above a maximum predetermined threshold temperature. In such event, the controller 318 may control the DC to AC converter 308 via control line 322 as needed to modify the power output provided by the UPS module 302. Alternatively, the load sharing software 318a of the controller 318 may be used to determine a suitable increase in the power output of the UPS module 302 module in response to a reduction in the power output of another UPS module 302 of a multi-module system making use of two or more of the UPS modules 302. Alternatively, the load sharing software 318a may be implemented in firmware of the controller 318. A communications bus 320 is used to enable communication between the controller 318 and the controller(s) of one or more other UPS modules 302 being used together in a load sharing multi-module UPS system. Communications bus 320 enables each controller 318 of each UPS module 302 to be made aware if changes are required to its output due to a required reduction in output of any other UPS module of the system.

Figure 4:
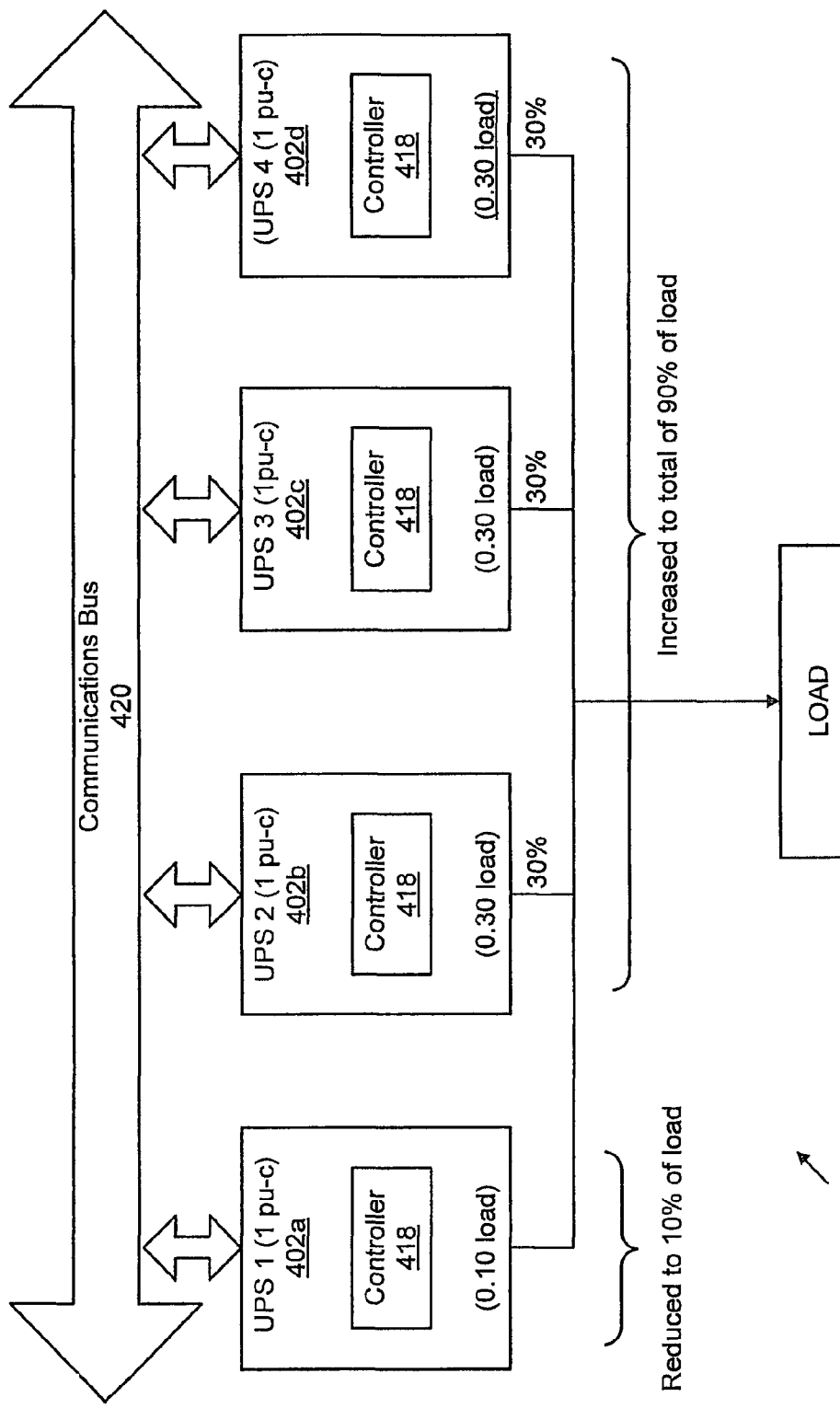
FIG. 4 is a block diagram of a load sharing, multi-module UPS system in accordance with one embodiment of the present disclosure, where the system makes use of a plurality of the UPS modules shown in FIG. 3, and where the controller of each UPS module is programmed to handle an equal percentage of the load being handled by the overall system.
Figure 5:
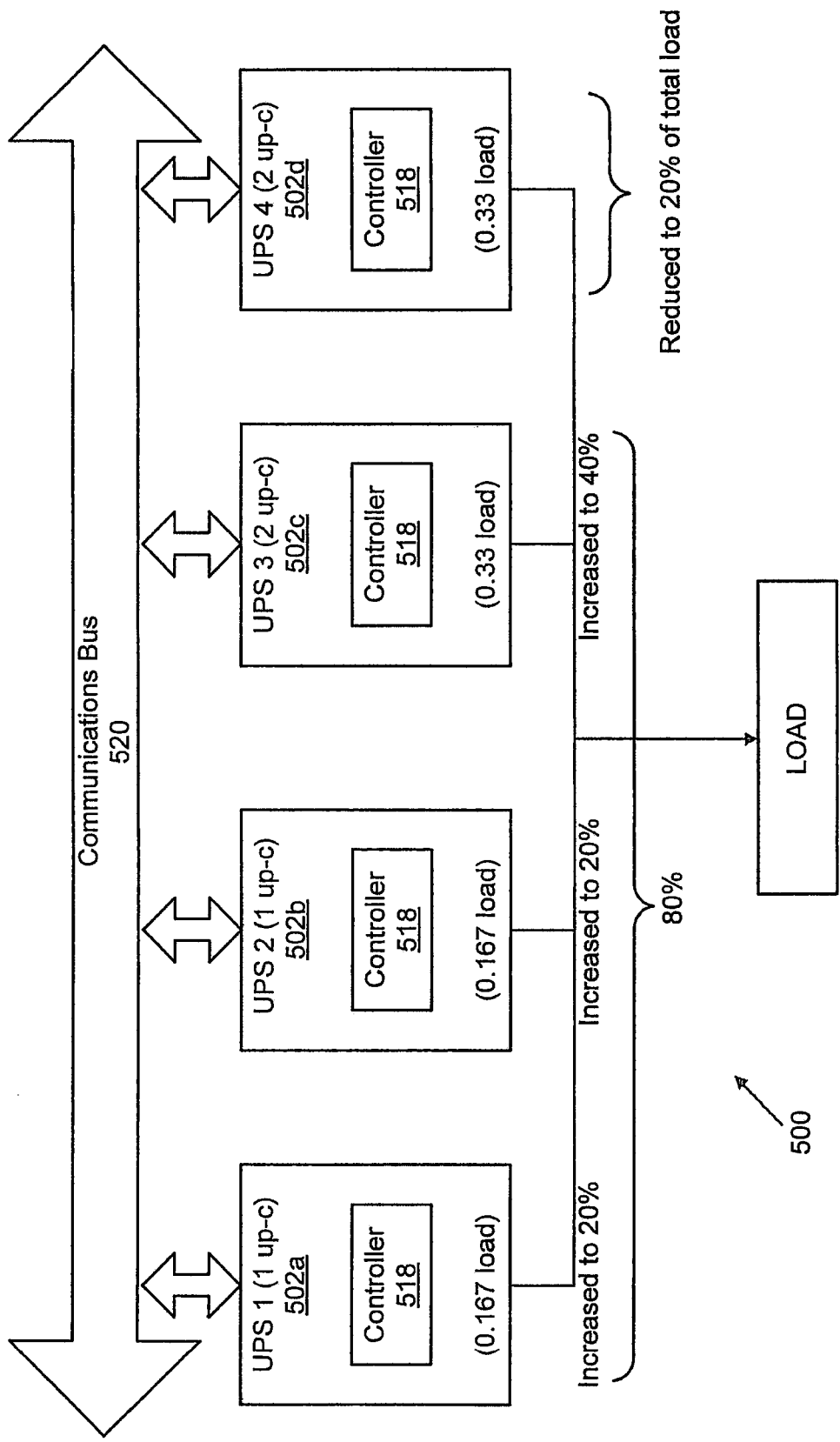
FIG. 5 is a block diagram of another embodiment of the present disclosure where a load sharing, multi-module UPS system makes use of a plurality of UPS modules, such as shown in FIG. 3, but where the UPS modules are programmed to handle different percentages of the overall load seen by the system, up to a predetermined maximum percentage.

FIGS. 4 and 5 are schematic illustrations of two different embodiments of load sharing multi-module UPS systems 400 and 500, respectively, making use of a plurality of the UPS modules 402 and 502. UPS modules 402 and 502 may each be identical in construction to module 302. Specific components of UPS modules 402 that are common with those of UPS module 302 will be designated with reference numerals increased by 100 over those used to describe UPS module 302. Similarly, specific components of UPS modules 502 mentioned in the following discussion will be denoted with reference numerals increased by 200 over those used to describe UPS module 302.

Beginning with FIG. 4, the exemplary embodiment of load sharing multi-module system 400 forms a balanced load sharing system and may include a plurality of UPS modules 402a-402d that each have the same pu-c rating. Each of the UPS modules 402a-402d has a controller 418 that may be programmed via software 418a to reduce its output in the event it is detected that it is experiencing an over-temperature condition. In this example when all of the UPS modules 402a-402d are operating within permitted temperature ranges, each module will be handling 25% of the load. When the controller 418 of any particular UPS module 402a-402d detects that its operating temperature has risen above a predetermined maximum temperature, then the controller 418 controls that particular UPS module so that it supplies a reduced percentage of the system load (i.e., reduces its power output) rather than shutting down the UPS module completely. Thus, for example, if UPS module 402a is detected to be operating at a temperature above a predetermined maximum operating temperature, then the controller 418 of UPS module 402a may determine the percentage reduction needed (i.e., percentage of load to be "shed") in its output to bring the operating temperature of the UPS module 402a back to within its predetermined limit. In this example, that power output reduction reduces (i.e., sheds) the percentage of the load that the UPS module 402a is able to handle down to 10% from what would otherwise have been 25% if the module 402a was handling an equal share of the load. The controller 418 of UPS module 402a communicates the newly determined (i.e. reduced) load percentage being handled by UPS module 402a to the other UPS modules 402b-402c via the communications bus 420. Upon receiving this information, the controller 418 of each other UPS module 402b-402c then determines that it needs to increase its power output to cover the reduction in the percentage of the load that was shed by UPS module 402a. Assuming this can be done without causing overheating of any of UPS modules 402b-402d, then each of UPS modules 402b-402d determines the new, increased power output that it must provide to make up for the reduction (i.e., the shed percentage amount) in the load handling percentage of UPS module 402a. In this instance each of the UPS modules 402b-402d is programmed in advance to know that there are four UPS modules total in the load sharing system 400, and the controller 418 of each module is therefore able to determine that it must increase its output power sufficiently to handle 30% of the total load (i.e., an increase from 25% to 30%). UPS modules 402b-402d are thus supplying 90% of the load while UPS module 402a only supplies 10% of the load. Thus, the system 400 operates to limit the percentage of the load for at least one of the UPS modules 402a-402d while increasing the percentage load being handled by at least one of the other UPS modules. This is strongly preferable to completely shutting down UPS module 402a, provided it is still capable of handling at least some percentage of the total load. Thus, UPS module 402a remains on-line, but is operating at a reduced capacity needed to prevent overheating.

FIG. 5 shows another embodiment of a load sharing multi-module UPS system 500. With the load sharing system 500 of FIG. 5, the UPS modules 502a-502d do not all have the same pu-c; rather UPS modules 502a and 502b each have a pu-c of 0.167, while modules 502c and 502d each have a pu-c of 0.33. Thus, during normal operating, UPS modules 502c and 502d are programmed to each handle 33.3% of the total load, while UPS modules 502a and 502b are each programmed to handle 16.7% of the total load. In this example the right most UPS module 502d is being managed to prevent an excessive operating temperature, and has its output reduced so that it is handling only 20% of the total load (i.e., 13.3% load shed). This is accomplished by the controller 518 reducing the power output of UPS module 502d to a level needed to ensure that its operating temperature remains within an acceptable range, which corresponds to handling a maximum of 20% of the total load (i.e., in this example half of its normal maximum capacity of 40%). The controller 518 of UPS module 502d communicates the new load percentage that it will be handling to the remaining UPS modules 502a-502c via the communications bus 520. The UPS modules 502a-502c each then determine (using their respective controllers 518) what percentage of the load they must accommodate, considering their pu-c capacities, and the controller 518 of each UPS module 502a-502c increases its respective output in accordance with its pu-c. Thus, the 13.3% reduction in the load percentage being handled by UPS module 502d is distributed between the remaining UPS modules 502a-502c in accordance with their respective pu-c ratings.

In UPS module 302, 402 and 502, the monitored temperatures, such as the temperature of critical components, inlet air and exhaust air, may be used to determine how much output reduction of the UPS module is needed to prevent excessive component temperature. For example, the thermal time constants of the components where an over-temperature condition occurs may be used in determining the rate of reduction in output or load shedding. An over-temperature condition of a component (or components) having a short thermal time constant results in a higher rate of load shedding (i.e., reduction in output) than is the case where the over-temperature condition is that of a component (or components) having a longer thermal time constant. System load changes may be taken into account so that system load increases will not result in an output increase of a UPS module 302, 402, 502 being managed to prevent excessive temperature. When the system load decreases, the proportion of the system load supplied by the UPS module (or modules) being managed to prevent excessive temperature is increased. If the system load decreases to the point that the "normal" load proportion on the UPS module (or modules) being managed to prevent excessive temperature is less than the managed value, the UPS module resumes balanced (e.g., in the case of a UPS modules 402a-402d) or proportional (in the case of a UPS modules 502a-502d) load sharing.

When the output of a UPS module 302, 402 or 502 is to be increased, or decreased to shed load, the technique for increasing or decreasing the output of a UPS module as described in U.S. Ser. No. 11/427,701 for "Maximized Battery Run-Time in a Parallel UPS System" filed Jun. 29, 2006 may be utilized. The entire disclosure of U.S. Ser. No. 11/427,701 is incorporated herein by reference.

For example, if the output of a UPS module 402a-402d or 502a-502d is to be varied, the amount of increase or decrease of the output may be determined as described above. For example, controller 418 of UPS module 402a may send a signal to its DC/AC converter (or inverter) to increase or decrease the amount of power provided by the DC/AC converter. If the critical bus (the bus to which the output of multi-module UPS system 400 or 500 is coupled, as the case may be) is an AC bus, then the phase angle of the power supplied by the DC/AC converter (i.e., inverter) is advanced with respect to the phase angle of the power on the critical bus to increase the output of the inverter. Conversely, the relative phase angle may be decreased to lower the power output of the inverter. It will be appreciated that a similar control scheme could be used in a system in which the critical bus is a DC bus, except, of course, that there is no phase angle to adjust. In that case the output voltage of the inverter may be adjusted so that it will provide more or less power.

Figure 6:
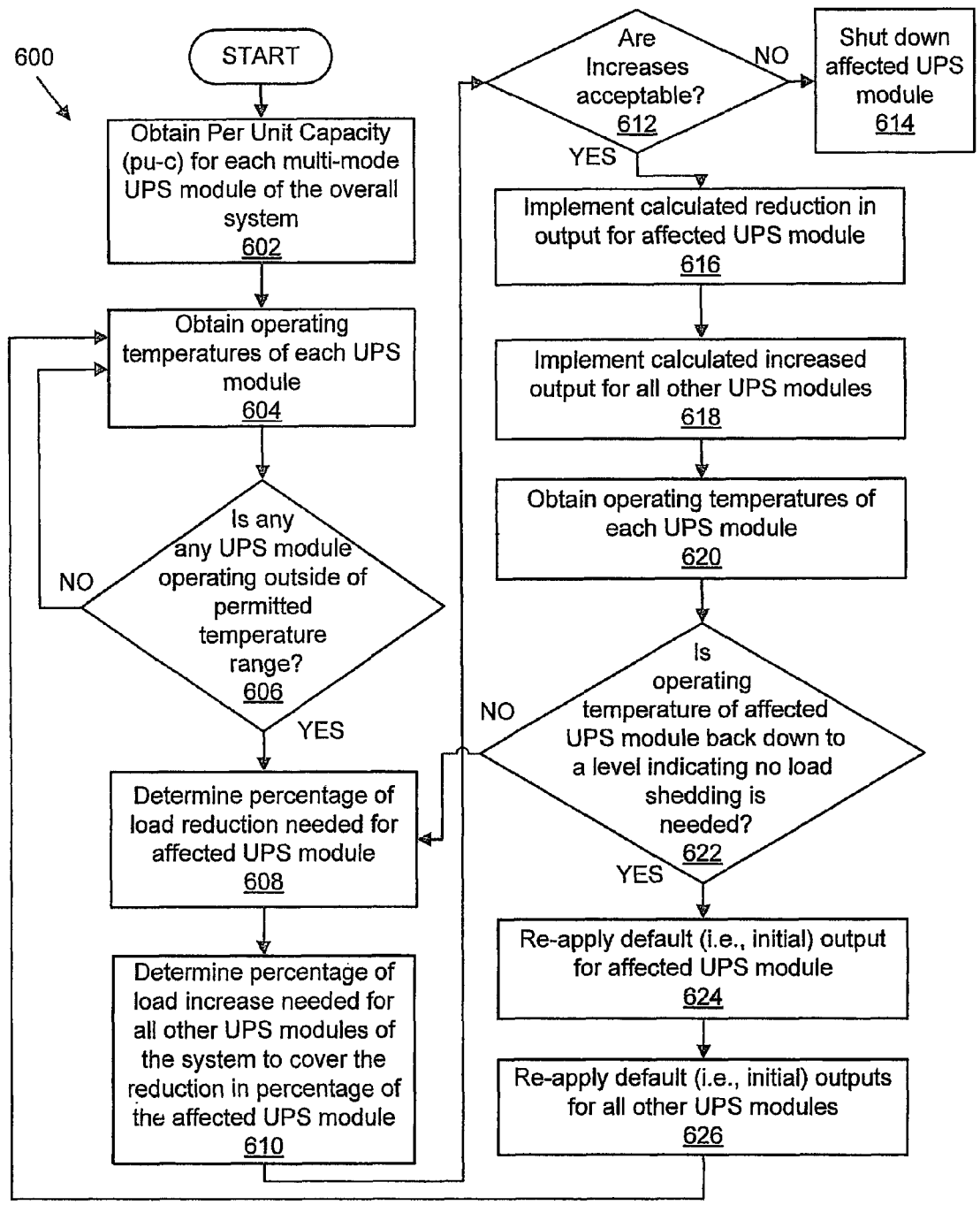
FIG. 6 is a flowchart setting forth various operations that may be performed with the systems of either FIG. 4 or 5.

Referring now to FIG. 6, a flowchart 600 is shown illustrating an exemplary sequence of operations in constructing and operating a load sharing multi-module UPS system. The operations shown in FIG. 6 may be implemented through either of the load sharing systems 400 or 500 in implementing load shedding. It will be appreciated that the flowchart 600 represents merely one exemplary sequence of operations, and additional operations may be added to modify and/or even further enhance the operating capabilities of the systems 400 and 500. For convenience, reference will be made to the system 400 of FIG. 4 when mentioning specific UPS modules or components of a load sharing system.

At operation 602, the per unit capacity (pu-c) for each UPS module 402a-402d of the overall system 400 is obtained. At operation 604 the temperature sensors associated with the components of each of UPS modules 402a-402d is obtained. At operation 606 a check is made to determine if any UPS module 402a-402d is operating outside of a permitted temperature range. If not, then a loop is made back to operation 604 to again check the operating temperatures of the UPS modules after some suitable, predetermined time period. This time period may vary considerably depending on the type of power supplies used, as well as the specific components used in power supply, but in one example the time period may be about every 20 ms.

If the check at operation 606 determines that one of the UPS modules 402a-402d is operating outside its temperature range, for example UPS module 402a, then the controller of UPS module 402a may determine the percentage of load handling reduction (i.e., load shedding) needed, as indicated at operation 608. At operation 610 the percentage level of load handling increase for the three other UPS modules 402b-402d is determined by the controllers 418 of each of those three UPS modules. At operation 612 a check is made to ensure that the newly calculated load handling percentage for the three UPS modules 402b-402d that will be handling additional load percentages is within their pu-c's. If not, at operation 614 the affected UPS module, in this example module 402a, is shut down. However, if the check at operation 612 determines that the newly calculated load percentage for each of the three UPS modules 402b-402d is within the pu-c rating of each, then load shedding may be implemented. This is accomplished by implementing a calculated output power reduction for UPS module 402a, as indicated at operation 616, that brings its load handling down to the percentage determined at operation 608. At operation 618 power increase(s) for the other three UPS modules 402b-402d are calculated and implemented to bring their load handling percentages up to the values determined at operation 610. At operation 620 the temperatures of the UPS modules 402a-402d are then re-checked. At operation 622 a determination is then made to see if the operating temperature of the one affected UPS module 402a that had its output power reduced is now back down to a level that allows the load shedding to be removed. If this inquiry produces a "No" answer, then operations 608-620 may be repeated. Obviously, if the operating temperature of the affected UPS module has not changed, then no additional adjustment (i.e., no additional load shedding and corresponding power output reduction) will be required for the affected UPS module 402a, and the load percentages previously determined at operations 608 and 610 will remain the same for all UPS modules 402a-402d. However, if the operating temperature of the affected UPS module 402a has further increased, as detected at operation 620, then re-performing operations 608-618 enables further modifications to the percentage load shedding for UPS module 402a, and the power output increases required for the remaining UPS modules 402b-402d to pickup the additional portion of the load that has been shed, to be determined and implemented.

If the check at operation 622 determines that the operating temperature of the affected module has dropped to a level where its power output may be increased back to its initial (e.g., default) level, and thus that load shedding is no longer required, then the default power output for the affected UPS module 402a-402 is reapplied at operation 624. At operation 626 the default outputs for the other three UPS modules 402a-402d that had their outputs increased is reapplied (i.e., reduced to default levels). Thus, operations 624 and 626 remove the load shedding so that the initial load percentage being handled by each UPS module 402a-402d is reinstituted.

It will be appreciated that the above described operations could be used to implement either balanced load shedding or unbalanced load shedding. Balanced load shedding will be where the three UPS modules 402b-402d picking up additional load all are controlled to accommodate equal portions of the additional load, and unbalanced load shedding will be where the three UPS 402b-402d modules are controlled to accommodate different percentages of the additional load.

A significant advantage of the system and method of the present disclosure is the ability to maintain as much capacity from each power supply module as possible without damaging any of the power supply modules. Thus, if a malfunction of a given one of the power supply modules of a multi-module system reduces its output capacity by a certain percentage, the affected power supply module will remain operating, but at a reduced capacity. This also provides the benefit of minimizing the added stress on the remaining power supply modules that are required to pick up the load that is shed by the affected power supply module.

It will also be appreciated that the system and method of the present disclosure is not limited to any particular power conversion topology. Thus, the teachings of the present disclosure may be used with power supplies using virtually any power conversion topology. The specific construction of the power supply modules discussed herein has been provided merely as an example of one form of power conversion topology that may be used with the present disclosure.

Example embodiments have been provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A load sharing, multi-module power supply system for supplying power to a load, the system comprising:
    a first power supply module having a controller and having a first per unit capacity (pu-c);
    a second power supply module having a controller and having a second per unit capacity (pu-c);
    a third power supply module having a controller and having a third per unit capacity (pu-c);
    said controller of said first power supply module adapted to implement a reduction in an output power of said first power supply module upon the detection of an operating event, where a portion of said load being handled by said first power supply module is shed by a determined percentage, and such that said first power supply module remains operating during said operating event but at a reduced power output level; and
    upon the occurrence of said operating event, said controllers of said second and third power supply modules being adapted to increase their respective said power outputs so that each of said second and third power supply modules accommodates a subportion of said portion of said load that has been shed by said first power supply module, and when needed, such that said controllers of said second and third power supplies increase the power outputs of their respective said power supply modules by different amounts, when needed, such that said second and third power supply modules assume different additional percentages of the load that was shed by the first power supply module.

2. The system of claim 1, wherein said operating event comprises a temperature increase of a component of said first power supply module beyond a predetermined temperature threshold.

3. The system of claim 1, wherein said controllers of said second and third power supply modules determine a level of said subportion that each will accommodate based in part on their respective per unit capacities.

4. The system of claim 1, further comprising a communications bus for enabling said controllers of said first, second and third power supply modules to communicate with one another.

5. The system of claim 1, wherein each of said controllers of said power supply modules includes load sharing software for assisting in determining a portion of said load that its respective said power supply module may accommodate.

6. The system of claim 1, wherein each said power supply module further comprises:
    a plurality of temperature sensors for monitoring a plurality of components thereof; and
    each of said temperature sensors being in communication with said controller.

7. The system of claim 6, wherein said plurality of components of each said power supply module comprises:
    an input magnetics subsystem;
    an AC to DC converter;
    a DC to AC converter;
    an output magnetics subsystem for generating said output power; and
    a bypass switch coupled across an input side of said input magnetics subsystem and an output side of said output magnetics subsystem, and controlled by said controller, for bypassing its respective said power supply module.

8. A method for load sharing using a multi-module power supply (UPS) system, the method comprising:
    using a first power supply module, and having a first per unit capacity (pu-c), to handle a portion of said load;
    using a second power supply module having a controller, and having a second per unit capacity (pu-c), to handle a second portion of said load;
    using a third power supply module having a controller, and having a third per unit capacity (pu-c), to handle a third portion of said load;
    when an operating event is detected by said first power supply module, reducing a power output of said first power supply module so that a percentage of said portion of said load being handled by said first power supply module is shed, but further such that said first power supply module remains operating during said operating event but at a reduced power output level; and
    upon the occurrence of said operating event, using said controllers of said second and third power supply modules to increase their respective said power outputs so that each of said second and third power supply modules accommodates a subportion of said portion of said load that has been shed by said first power supply module, and further such that said controllers of said second and third power supply modules increase their respective power outputs by different amounts, when needed, such that said second and third power supply modules assume different additional percentages of the load that was shed by the first power supply module.

9. The method of claim 8, wherein said subportions of said load being accommodated by said second and third power supply modules after the occurrence of said operating event are equal subportions.

10. The method of claim 8, wherein said controllers of said second and third power supply modules use said per unit capacity ratings of their respective said power supply modules in determining what percentage of said portion of said load being shed by said first power supply module that each of said second and third power supply modules is able to accommodate.

* * * * *